(12) United States Patent
Chou (10) Patent No.: US 8,356,016 B1
(45) Date of Patent: Jan. 15, 2013

(54) FORWARDING FILESYSTEM-LEVEL INFORMATION TO A STORAGE MANAGEMENT SYSTEM

(75) Inventor: Randy Yen-pang Chou, San Jose, CA (US)

(73) Assignee: Panzura, Inc., San Jose, CA (US)

( * ) Notice: Subject to any disclaimer, the term of this patent is extended or adjusted under 35 U.S.C. 154(b) by 0 days.

(21) Appl. No.: 13/225,194

(22) Filed: Sep. 2, 2011

(51) Int. Cl.
*G06F 7/00* (2006.01)
*G06F 17/00* (2006.01)
*G06F 12/00* (2006.01)
*G06F 17/30* (2006.01)

(52) U.S. Cl. ......... 707/687; 707/690; 707/695; 707/827
(58) Field of Classification Search .................. 707/694, 707/827, 687, 690, 695, 821
See application file for complete search history.

(56) References Cited

U.S. PATENT DOCUMENTS

| | | | |
|---|---|---|---|
| 6,466,978 B1 * | 10/2002 | Mukherjee et al. | 709/225 |
| 6,697,846 B1 * | 2/2004 | Soltis | 709/217 |
| 7,610,285 B1 * | 10/2009 | Zoellner et al. | 1/1 |
| 7,844,582 B1 * | 11/2010 | Arbilla et al. | 707/694 |
| 7,865,873 B1 * | 1/2011 | Zoellner et al. | 717/110 |
| 2012/0011176 A1 * | 1/2012 | Aizman | 707/822 |

* cited by examiner

*Primary Examiner* — Merilyn Nguyen
(74) *Attorney, Agent, or Firm* — Park, Vaughan, Fleming & Dowler LLP; Mark D. Spiller (57) ABSTRACT

The disclosed embodiments provide a system that facilitates forwarding filesystem-level information to a storage management system. During operation, a computing device receives a request for a file operation from a client computing device, and issues one or more filesystem operations in response. A filesystem device driver extracts filesystem-level information from these filesystem operations, and then forwards the extracted filesystem-level information to the storage management system.

18 Claims, 9 Drawing Sheets

FORWARDING FILESYSTEM-LEVEL INFORMATION TO A STORAGE MANAGEMENT SYSTEM

BACKGROUND

1. Field of the Invention

This disclosure generally relates to techniques for providing flexible and extensible network storage systems. More specifically, this disclosure relates to techniques for using a filesystem device driver to forward filesystem-level information to a network-based storage management system.

2. Related Art

Enterprise data centers typically include large numbers of storage devices that can be accessed using high-speed networks. However, the management overhead for a large number of storage devices can become substantial. For instance, maintaining data consistency, redundancy, and storage system performance in the presence of hard drive failures can involve substantial time, effort, and expertise.

A number of "cloud-based storage" vendors attempt to simplify storage management by providing large-scale remote network storage solutions. Such vendors can leverage economies of scale to provide extensive data storage capacity that can be leased and accessed by clients. Clients can leverage such storage solutions to offload storage management overhead and to quickly and easily increase their data storage capacity on an as-needed basis. However, cloud-based storage involves another set of inherent risks and overheads. For instance, storing data remotely ("in the cloud") often increases access latency, and multiple clients simultaneously accessing a shared data set in a cloud-based storage system may suffer from data consistency problems. Furthermore, network failures and/or outages in cloud-based storage systems can prevent clients from accessing their data for significant periods of time.

Hence, what is needed are techniques for providing network-based storage capabilities without the above-described problems of existing techniques.

SUMMARY

The disclosed embodiments provide a system that facilitates forwarding filesystem-level information to a storage management system. During operation, a computing device receives a request for a file operation from a client computing device, and issues one or more filesystem operations in response. A filesystem device driver extracts filesystem-level information from these filesystem operations, and then forwards the extracted filesystem-level information to the storage management system.

In some embodiments, the storage management system is associated with a network-attached (NAS) storage device that caches data stored in a network storage system. The storage management system uses the forwarded filesystem-level information to manage file data associated with the request in the NAS device and the network storage system.

In some embodiments, extracting and forwarding filesystem-level information decouples the request from any specific block-level storage device. Because cloud storage providers typically allow the amount of available data storage space to be adjusted dynamically, this decoupling and the data-caching role of the NAS facilitates transparently providing extensible data storage capabilities to client computing devices.

In some embodiments, the computing device receives Common Internet File System (CIFS) requests.

In some embodiments, two or more of the front-end computing devices serve as gateways to the network storage system. For instance, these computing devices can collaborate to ensure the consistency of data stored in the network storage system. For example, these computing devices can simultaneously receive Common Internet File System requests for the same data set from multiple client computing devices.

In some embodiments, one or more of the front-end computing devices determine (1) whether and/or when to cache data associated with the file on a front-end computing device, and (2) whether and/or when to store data associated with the file in the network storage system.

In some embodiments, the filesystem device driver operates at a level of abstraction that facilitates forwarding the full set of semantic file information available on the client computing device to the storage management system. For instance, this forwarded information can include: a file name; a file type; a requested file operation; a set of application information associated with the file; one or more users accessing the file; and security information for the file.

In some embodiments, a computing device that serves as a front-end for a network (cloud-based) storage system executes a guest operating system on a virtual machine. When this guest operating system receives a request for a file operation from a client computing device, a filesystem device driver for the guest operating system forwards filesystem-level information associated with the request to the host operating system of the computing device. The host operating system then uses this forwarded information to manage a file associated with the request in the computing device and the network storage system.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Evolution of Network-Based Storage Systems

The proliferation of the Internet and large data sets have motivated a range of specialized data storage techniques. For instance, network-attached storage (NAS) devices often serve as centralized storage devices that provide large amounts of storage space for a set of heterogeneous clients in an enterprise. Such devices are typically tuned to provide a desired level of performance, redundancy (e.g., using a redundant array of independent disks (RAID)), and high availability. For example, while typical filesystems may take a substantial amount of time to recover from a crash (as the system has to process logs and/or journals to correctly rebuild modified data that was queued or in the process of being written at the time of the crash), NAS devices often incorporate transactional copy-on-write filesystems, which sacrifice some read performance in exchange for faster crash recovery. In a transactional copy-on-write filesystem, a file is not modified in place; instead, the system uses a delta encoding to append modifications ("deltas") to the previous file data. Such encodings increase the overhead associated with read operations, because the system incurs additional computation and access time to read and process deltas stored at the end of a file. However, this encoding also ensures that files are "data-consistent" (e.g., reliably incorruptible and consistent across crashes and reboots), thereby allowing NAS devices to recover quickly from failures. Such characteristics and capabilities have made NAS devices popular in enterprise environments.

Figure 1A:
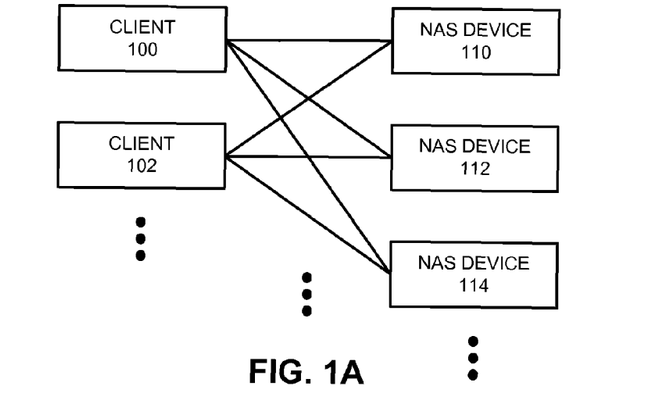
FIG. 1A illustrates a set of clients that are configured to access NAS devices.

Unfortunately, storage scalability can become problematic when data needs outscale the capabilities of a single NAS device; providing redundancy across multiple separate NAS devices (as illustrated in FIG. 1A) can involve substantial configuration expertise. For instance, consider the scenario of responding to a drive failure. Typically, a redundant storage system attempts to restore lost bits and re-establish redundancy as quickly as possible. However, in some scenarios, depending on the application and load, the storage system may need to place higher priority on continuing to serve client requests with a specified level of performance, and hence may need to delay restoration efforts.

Storage systems typically need to be architected very carefully based on expected client needs, application needs, and load characteristics.

Figure 1B:
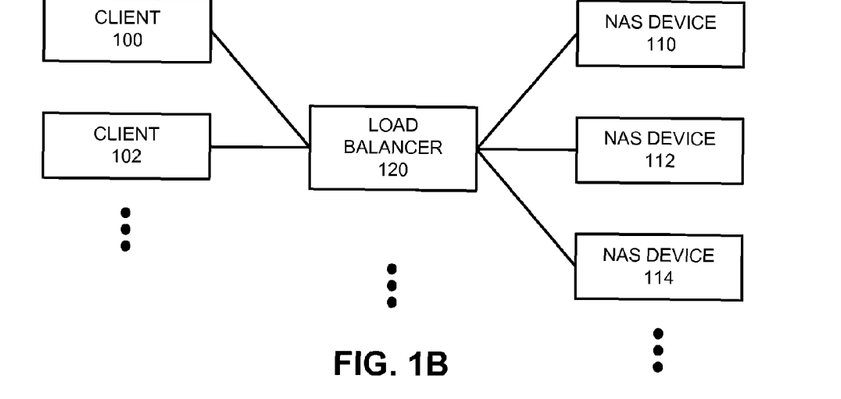
FIG. 1B illustrates a set of clients that are configured to access NAS devices via a load balancer.

FIG. 1A illustrates a set of clients (100-102) that are configured to access NAS devices (110-114). Note that management overhead typically increases in proportion with the amount of storage available. For instance, as the number of supported applications and storage space increase, a storage system may need to grow to include a load balancer 120 between the clients (100-102) and the NAS devices (110-114), as illustrated in FIG. 1B. Load balancer 120 can explicitly partition applications and clients to a given NAS device, and then route requests accordingly. While initial NAS vendors primarily focused on speed and reliability, as storage needs have continued to grow NAS vendors have also begun to compete by including sophisticated system management solutions that facilitate adapting to different storage, performance, and failure scenarios.

Figure 2:
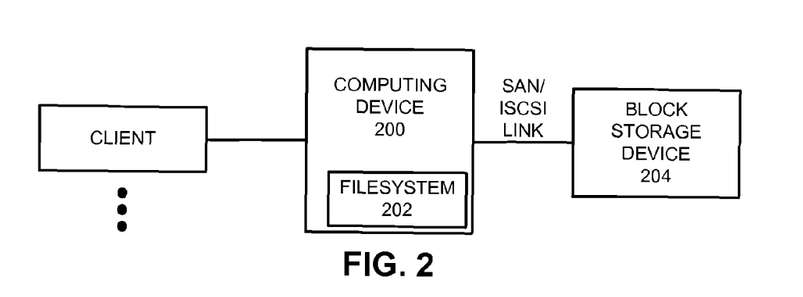
FIG. 2 illustrates a network storage system that provides remote storage with a disk-level abstraction.

FIG. 2 illustrates another network storage system that provides remote storage, but with a disk-level abstraction. In such an architecture, a computing device 200 manages filesystem metadata 202 locally, and then sends block-level read/write requests to a remote block storage device 204 via a storage area network (SAN) (e.g., by using the Internet Small Computer System Interface (ISCSI) or a Fibre Channel protocol). More specifically, block storage device 204 provides only a block storage interface, and is unaware of any filesystem structure associations (e.g., file names and/or structures) for the stored blocks. Such storage systems typically do not use transactional copy-on-write filesystems, and hence are not data-consistent.

Note that there is a significant distinction between filesystem-level operations and block-level (e.g., disk-level) operations. A filesystem typically serves as an intermediary between an operating system and one or more block-level devices. More specifically, a filesystem typically attempts to efficiently manage one or more block-level devices to provide more sophisticated storage services to an operating system. For instance, filesystems often manage disk blocks and meta data to provide structure (e.g., files and directories) and some notion of access rights and data consistency (e.g., via file lock operations) for an underlying block storage mechanism. Hence, filesystem-level operations provide a higher level of abstraction (e.g., a filename and an ordering associated with an underlying set of disk blocks) for the block storage mechanism.

Typically, a filesystem and an associated block storage device both operate in the context of the same computing device, and the block storage device has been specially initialized (e.g., formatted) to support the filesystem. Upon receiving a request for a filesystem operation (e.g., from an operating system and/or application), the filesystem determines and initiates a set of block-level operations needed to service the request. Hence, there is a notion of "filesystem-level information" (e.g., the level of information managed by the filesystem and received in a request for a file operation) and a separate notion of "block-level information" that is used when the filesystem operates upon the underlying block storage device. In the example of FIG. 2, the functionality of the filesystem and the underlying block storage are split across two different devices (computing device 200 and block storage device 204). As mentioned above, block storage device 204 provides only a block storage interface, and is unaware of any filesystem structure associations for the stored blocks. Block storage device 204 may store filesystem meta data on behalf of filesystem 202, but it is filesystem 202 that provides the higher level of abstraction to the operating system of computing device 200.

A number of "cloud-based storage" vendors attempt to simplify storage management by providing large-scale network storage solutions. Such vendors can leverage economies of scale to provide data centers with extensive data storage capacity that can then be rented and accessed by clients, thereby allowing clients to offload storage management overhead and easily increase their data storage on an as-needed basis. However, cloud-based storage also includes another set of inherent risks and overheads. Storing data remotely ("in the cloud") often increases access latency, and network failures and/or outages in cloud-based storage systems can prevent clients from accessing their data for substantial time intervals. Furthermore, multiple clients simultaneously accessing a shared data set in a cloud-based storage system may suffer from data consistency issues.

Client systems typically use network protocols (such as the Network File System (NFS) and the Common Internet File System (CIFS) protocols) to access network-based storage systems. CIFS (also sometimes referred to as Server Message Block (SMB)) is a complex application-layer network protocol that includes many application-specific capabilities that blur the typical separation between filesystems and applications. When a user accesses a file on a client system using software (e.g., Microsoft Office) that supports CIFS functionality, the client system may send CIFS requests to the network storage system to inform that the file has been opened and to store specific data. The CIFS server receiving the request for the file operation recognizes the file type, and can provide application-specific support. For instance, the CIFS server may maintain a network connection, and after determining that only that client is accessing the file, instruct the client to continue to cache file data indefinitely. Later, upon detecting that another client is attempting to open the file, the CIFS server can instruct the first client to flush the cached file data, and provide collaboration capabilities to both clients. Such functionality can enhance the user experience, but can complicate the interface between clients and storage systems; crafting a high-performance implementation of the CIFS protocol can involve substantial effort and expense.

In addition to complexity, CIFS also suffers from a range of other drawbacks and/or limitations. CIFS does not allow requests to be proxied; all requests need to be addressed directly to the hosting server, which locks the underlying data. CIFS is also a "chatty" protocol (e.g., CIFS generates substantial bi-directional status and update traffic). In a distributed environment, these characteristics can result in substantial load and latency issues.

Embodiments of the present invention combine NAS capabilities and cloud-based storage to provide a high-capacity, high-reliability storage system that can be accessed from multiple front-ends via an application-layer network protocol (e.g., CIFS).

Extracting and Forwarding Filesystem-Level Information

In some embodiments, a customized filesystem device driver in an operating system decouples filesystem functionality from an underlying block storage mechanism, thereby allowing filesystem-level information to be forwarded to another filesystem and/or data management mechanism. For instance, in some embodiments a customized filesystem device driver in an operating system may forward such filesystem-level request information to a range of network storage devices and/or distributed architectures that can provide enhanced data storage capabilities to client computing devices.

Operating systems often support several standard filesystems (e.g., the DOS filesystem, the New Technology File System (NTFS), and CDROM filesystems), but sometimes also include an open interface that facilitates accessing special devices and providing third-party interoperability (e.g., to support USB flash drives and filesystems associated with other operating systems, and to allow the development and support of future filesystems). In some embodiments, such interfaces can be used to create a filesystem device driver that emulates a local filesystem and storage device to the local operating system, but actually instead forwards filesystem-level request information to (and receives responses from) a non-block-level storage management system and/or filesystem.

In some embodiments, the disclosed forwarding techniques facilitate leveraging an existing implementation of a request server to reduce implementation overhead and complexity. For instance, as described above, implementing CIFS involves substantial effort and expense. Hence, some embodiments may provide CIFS capabilities by executing an operating system (e.g., Microsoft Windows Server 2008 Core, which includes embedded, high-performance CIFS server functionality with low memory usage) that can manage CIFS requests, but then use a customized filesystem device driver to extract and forward filesystem-level information that was received in CIFS requests. Note that this is distinct from techniques that direct file operation requests to a filesystem (such as NTFS) that then directly performs corresponding block-level operations upon a block storage device; forwarding filesystem-level information facilitates adding additional layers of capabilities and services prior to (or in place of) performing lower-level storage operations.

Figure 3A:
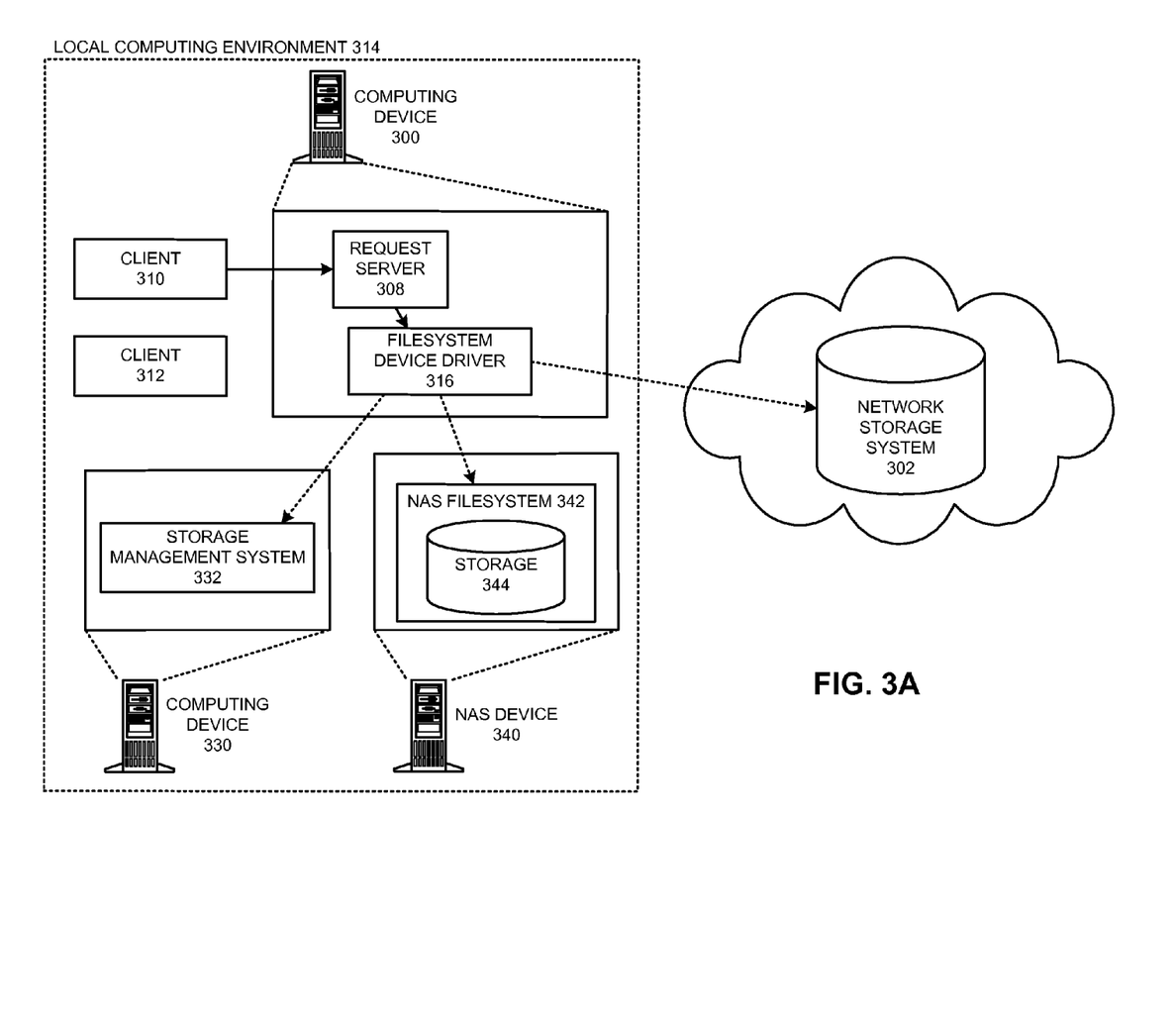
FIG. 3A illustrates a computing device that receives and forwards requests for filesystem operations in accordance with an embodiment.

FIG. 3A illustrates a computing device 300 that receives and forwards requests for filesystem operations. Computing device 300 executes a request server 308 that receives requests for file operations from clients (310-312) in its computing environment 314. Request server 308 sends instructions to a filesystem device driver 316 to perform the requested file operations. However, instead of managing a disk drive and disk operations, filesystem device driver 316 instead can be configured to forward filesystem-level information associated with the request to a range of other devices and/or mechanisms. For instance, filesystem device driver 316 may be configured to forward filesystem-level request information to one or more of the following: a network storage system 302 that is outside local computing environment 314; a storage management system 332 on another computing device 330; and/or an NAS device 340. Note that NAS device 340 may comprise a range of capabilities and architectures. For instance, NAS device 340 may comprise a compute server that uses an NAS filesystem 342 (e.g., a transactional copyon-write filesystem) and a range of local storage capacities 344 to handle network file requests.

In some embodiments, an NAS device serves as a front-end to a remote network ("cloud-based") storage system. This NAS device provides a standard request interface (e.g., CIFS), and uses local storage capabilities to cache the working data set that is being accessed in its local computing environment. The high-capacity cloud storage system stores the full data set for an enterprise, and serves as a backing store for the NAS device. This architecture combines the performance and interface of a local NAS device with the capacity of a cloud storage system, while reducing management complexity.

Figure 3B:
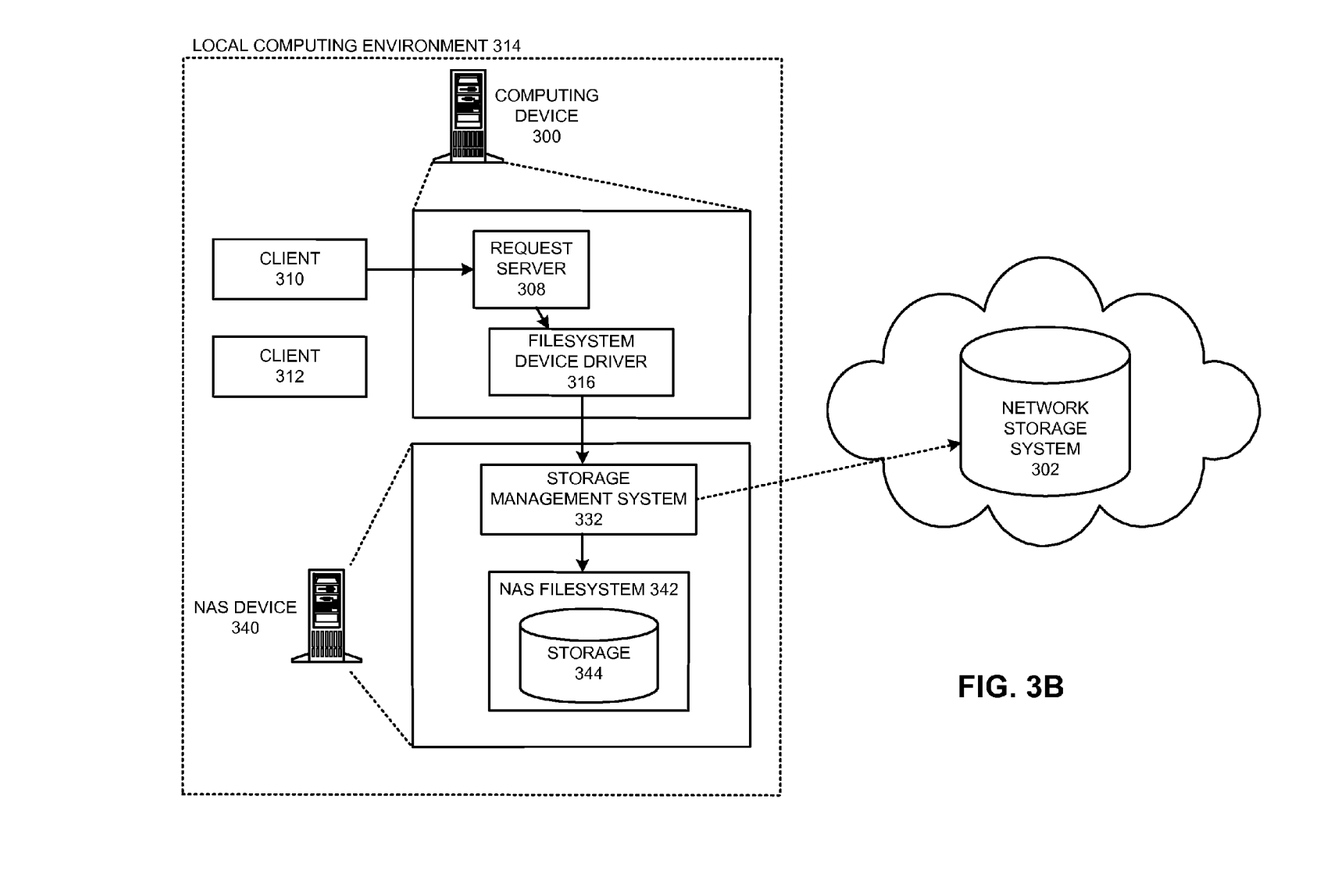
FIG. 3B illustrates a computing device that forwards requests for filesystem operations to an NAS device in accordance with an embodiment.

FIG. 3B illustrates a scenario in which storage management system 332, NAS filesystem 342, and storage 344 are co-located on NAS device 340. For instance, filesystem device driver 316 may forward filesystem-level information from requests to storage management system 332, which can then use this information to determine whether file data should be stored (or accessed) in NAS filesystem 342 and storage 344 and/or network storage system 302. For instance, storage management system 332 may determine how to distribute and/or duplicate file information associated with the request between storage 344 and network storage system 302. The local working data set for an organization is usually relatively small (compared to the full enterprise data set), and hence can typically fit into a reasonably provisioned local storage 344 mechanism. From the client perspective, data access remains substantially similar to the simplest NAS device scenarios described above; computing device 300 serves as a single point of contact, no load balancer is needed to map applications of clients to specific NAS devices, and clients 310-312 are unaware of the interaction between storage management system 332 and network storage system 302. Note also that while request server 308 is not limited to receiving requests from local computing environment 314, request server 308 may also be configured to service requests for other clients outside of local computing environment 314. Similarly, in some scenarios one or more front-end computing devices 300/301 may be co-located with network storage system 302.

In some embodiments, filesystem-level information can be forwarded by executing an operating system with a desired server capability (e.g., Microsoft Windows Server 2008 Core) in a virtual machine. Note that, as above, this "guest" operating system does not execute in a stand-alone configuration (e.g., with an underlying NTFS filesystem and disk drive), but instead can be configured to forward filesystem-level information (e.g., CIFS requests) to (and receive responses from) an underlying storage management system that provides data-consistent capabilities. For instance, a customized filesystem device driver in the guest operating system can forward request information to (and receive responses from) a storage management system in the host operating system. Note that such forwarding behavior in the guest operating system is distinct from typical storage operations for a guest operating system. Typically, upon receiving a request for a file operation, a guest operating system accesses an associated (virtual) filesystem and outputs a block-level storage request that is received and handled by the host operating system; hence, no filesystem-level information is sent to the host operating system. In contrast, in the described embodiments, the guest operating system forwards filesystem-level information, not block-level information, to the host operating system.

Figure 3C:
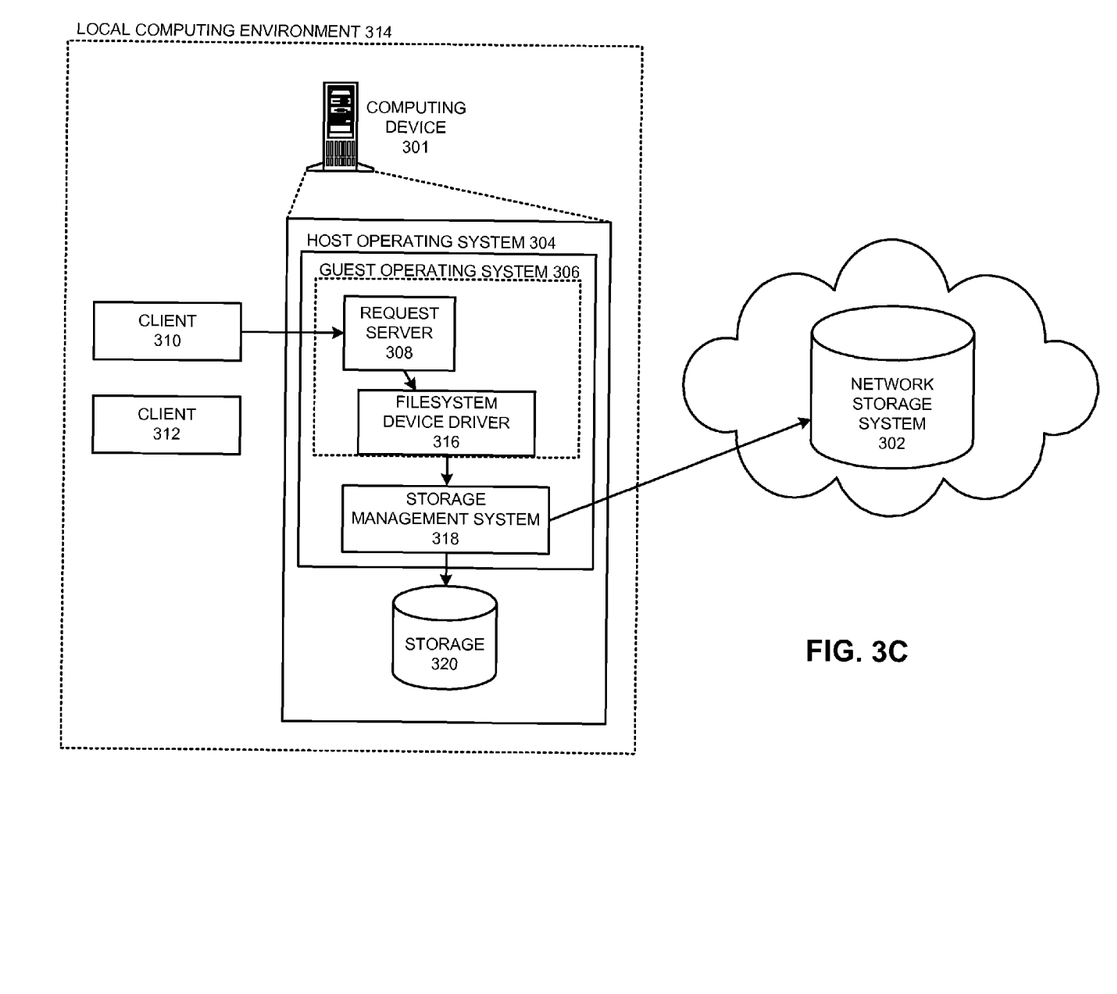
FIG. 3C illustrates a computing device in which a filesystem device driver in a guest operating system forwards requests for filesystem operations in accordance with an embodiment.

FIG. 3C illustrates a computing device 301 in which a filesystem device driver 316 in a guest operating system 306 forwards requests for filesystem operations. Note that computing device 301 also serves as a front-end to a remote network storage system 302. Computing device 301 includes a host operating system 304 that executes guest operating system 306 in a virtual machine. A request server 308 (e.g., a CIFS server) in guest operating system 306 receives requests for file operations from clients (310-312) in its local computing environment 314. Request server 308 sends instructions to filesystem device driver 316 to perform the requested file operations. However, instead of managing a disk drive and disk operations (and/or using a virtual filesystem to send block-level requests to host operating system 304), filesystem device driver 316 instead is configured to forward filesystem-level information associated with the request to a storage management system 318 in host operating system 304 (e.g., via a virtual device interface in host operating system 304). As in FIG. 3B, storage management system 318 then determines how to distribute and/or duplicate file information associated with the request between local storage 320 and network storage system 302.

Figure 4A:
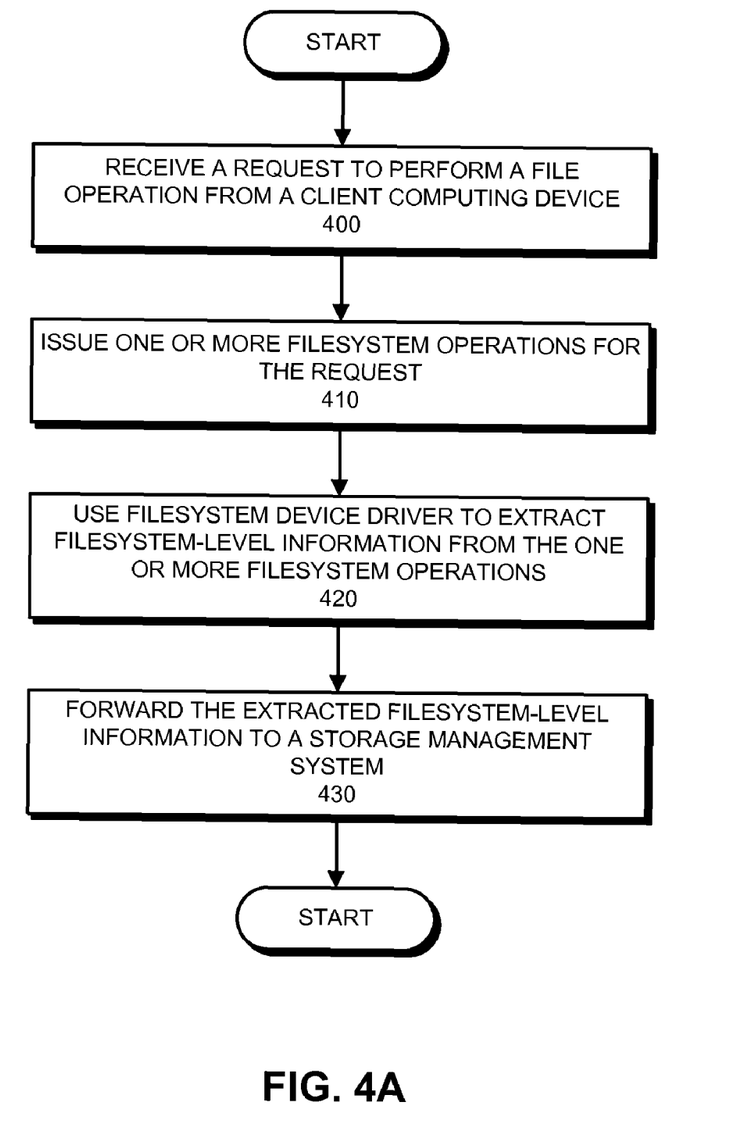
FIG. 4A presents a flow chart that illustrates the process of forwarding filesystem-level information in accordance with an embodiment.

FIG. 4A presents a flow chart that illustrates the process of forwarding filesystem-level information. During operation, a computing device receives a request for a file operation from a client computing device (operation 400). In response, the operating system of the computing device issues one or more filesystem operations for the request (operation 410). A filesystem device driver receives and extracts filesystem-level information from these filesystem operations (operation 420), and then forwards the extracted filesystem-level information to a storage management system (operation 430).

Figure 4B:
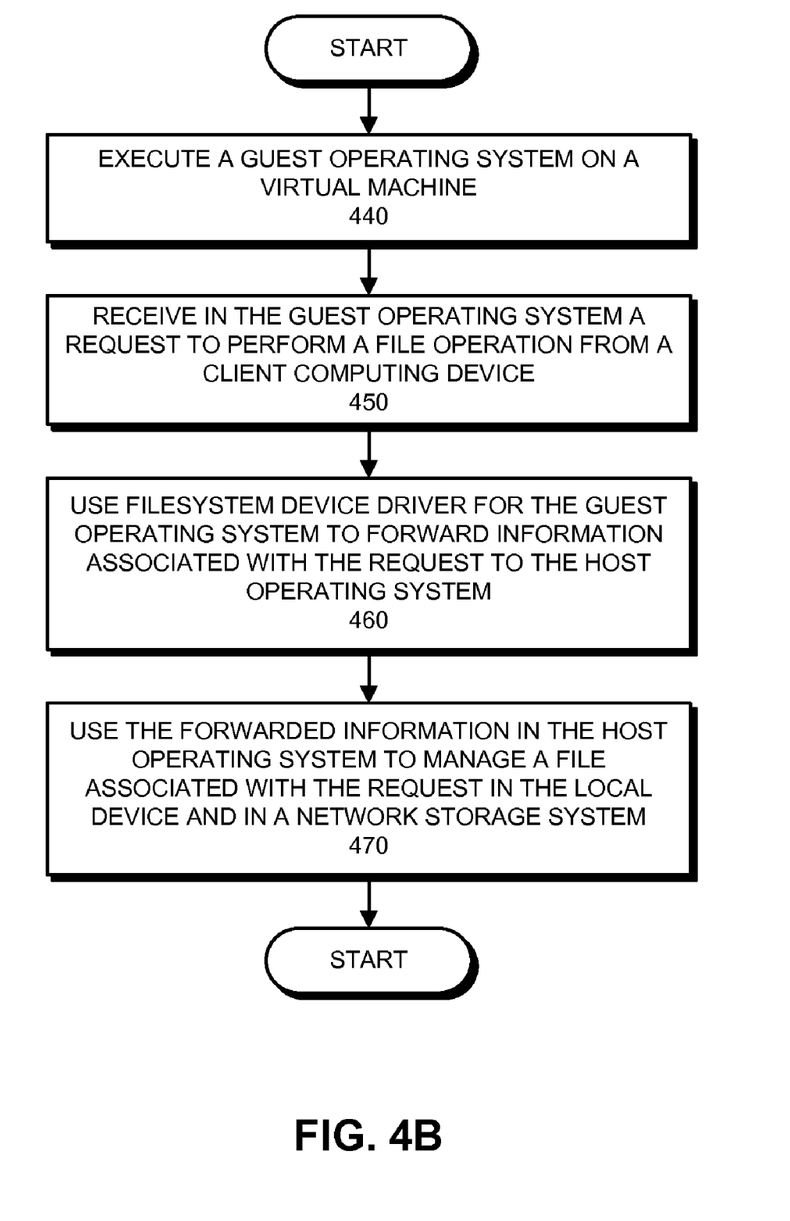
FIG. 4B presents a flow chart that illustrates the process of using a guest operating system to forward filesystem-level information in accordance with an embodiment.

FIG. 4B presents a flow chart that illustrates the process of using a guest operating system to forward filesystem-level information. During operation, a computing device that serves as a front-end for a network storage system executes a guest operating system on a virtual machine (operation 440). When this guest operating system receives a request for a file operation from a client computing device (operation 450), a filesystem device driver for the guest operating system forwards filesystem-level information associated with the request to the host operating system of the computing device (operation 460). The host operating system then uses this forwarded information to manage a file associated with the request in the computing device and the network storage system (operation 470).

In some embodiments, the customized filesystem device driver extracts, tracks, and forwards client file interactions on a per-file and a per-directory basis. More specifically, semantic filesystem-level information included in the application-layer network protocol (e.g., CIFS) is forwarded by the filesystem device driver to a storage management system. This semantic information can include, but is not limited to: a file name; a file type; a requested file operation (e.g., a read, write, or update operation); a set of application information associated with the file; one or more users accessing the file; and security information for the file. The (potentially distributed) storage management system can use this information to determine whether a file and its associated information should be cached locally and/or forwarded to the network storage system (or other devices accessing the network storage system, as described below). For instance, the storage management system may know that certain files will be duplicated and/or shared shortly after being modified, and hence may ensure that such files are both cached locally and forwarded to the network storage system to facilitate the expected duplication operation.

In some embodiments, decoupling a filesystem from underlying block storage devices facilitates transparently changing (e.g., either increasing or decreasing) the amount of storage space accessible by clients. Operating systems typically assume that filesystem device drivers always manage fixed-size volumes; storage devices normally have a fixed size, so this usually is not an issue. However, one of the benefits of using cloud-based storage is the ability to easily increase data capacity on demand. For instance, for the above-described scenario where a local NAS device caches data for a cloud storage system, the amount of space available to clients can be increased by leasing additional space in the cloud (network) storage system and communicating the change to clients as needed (e.g., upon request) through the filesystem device driver. Hence, in such embodiments the customized filesystem device driver and the disclosed caching architecture substantially simplify adjusting data storage capabilities. In contrast, expanding traditional storage systems typically may involve shutting down a storage device, physically adding additional storage devices, and then reconfiguring the entire storage system to accommodate the added storage space.

In some embodiments, volume size can be changed transparently regardless of any pending client operations. In alternative embodiments, the presence of some active filesystem connections and/or operations may require some or all connected clients to be disconnected during volume size changes (e.g., preventing some clients from actively accessing files), which may be infeasible or inconvenient. Hence, in some embodiments, the filesystem device driver may be configured to claim an initial fixed size that substantially overstates the expected amount of storage, to prevent future re-sizing logistics. The allocated portion of the cloud storage system may initially provide only a small subset of this claimed storage size, but then subsequently be dynamically expanded as needed. In some embodiments, such size configurations may be accompanied by user quotas to prevent storage space wastage.

Note that a filesystem device driver provides a higher level of abstraction than techniques that attempt to analyze disk-block-level traffic (e.g., in the disk-level remote storage system illustrated in FIG. 2). More specifically, such techniques attempt to re-create filesystem information by reverse-engineering block-level storage transactions. However, because these storage transactions typically do not include higher-level (e.g., file- and directory-level) information, such attempts typically involve substantial effort, and do not provide the same level of tracking capabilities. In contrast, a customized filesystem-level device driver facilitates forwarding reliable high-level semantic information without additional processing overhead and without modifying the guest operating system.

In some embodiments, the described techniques provide filesystem-level proxy functionality. In many situations, proxies are implemented at the abstraction level of networking protocols, but this becomes more difficult as network protocols become more complicated (e.g., by adding application-specific information, as in CIFS). Hence, instead of re-implementing a complicated network protocol, some of the disclosed embodiments create a proxy at another, simpler layer by using a customized filesystem device driver that extracts and "tunnels" (e.g., forwards) filesystem-level information to another storage management system. Note that a filesystem-level proxy can also provide additional benefits. For instance, by emulating a local filesystem and storage device, the disclosed techniques can also overcome restrictions imposed by certain resource-intensive applications (e.g., certain databases, email server products, and/or data protection managers) to only use local storage devices.

Using Multiple Front-Ends to Access Cloud-Based Storage

The previous section describes the architecture of the computing devices that serve as front-ends (or "gateways") to a network storage system. In some embodiments, two or more of such computing devices work together to collectively manage and access a shared set of files that are stored in the network storage system.

Figure 5:
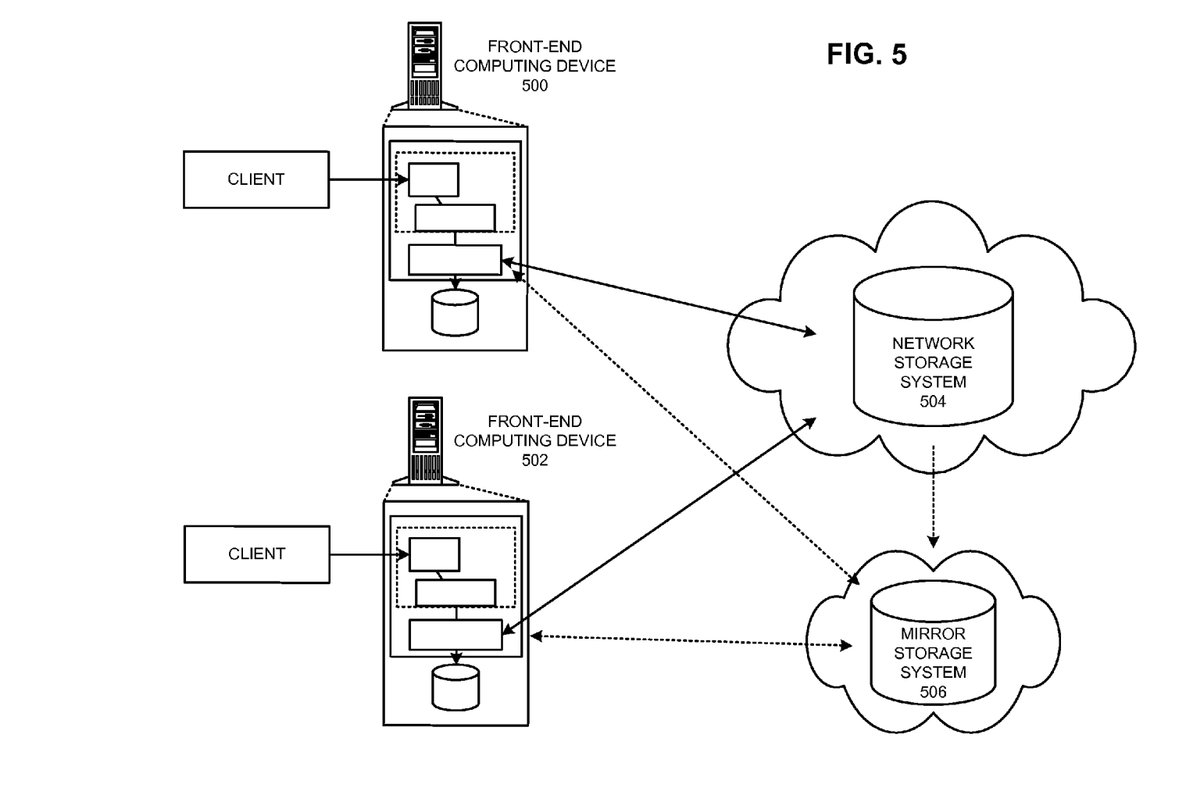
FIG. 5 illustrates multiple front-end computing devices that simultaneously access and manage data in a remote network storage system in accordance with an embodiment.

FIG. 5 illustrates multiple front-end computing devices 500-502 (as individually illustrated in FIGS. 3A-3C and described above) that collectively manage data in a network storage system 504. Both devices 500-502 support application-layer network requests (e.g., CIFS requests) from their respective clients, and then collectively ensure data coherency and access performance for the shared data. Furthermore, the storage management systems in front-end computing devices 500-502 incorporate aspects of a transactional copy-on-write filesystem, thereby ensuring that file operations are data-consistent and that the system can quickly recover from crashes.

Note that the described architecture can overcome limitations in an application-layer network protocol. As described above, CIFS does not allow requests to be proxied, and requires that a single hosting server manage the underlying filesystem. However, the disclosed filesystem forwarding mechanisms provide a level of abstraction where each guest operating system assumes it is the sole manager of the shared data. The underlying storage management systems in the host operating systems can pass application-level request information to one another to ensure that consistency is maintained. Thus, the disclosed techniques leverage existing CIFS implementations (via the guest operating system), but also extend CIFS capabilities to allow multiple CIFS servers to share access to underlying data. Note that the storage management systems may not need to understand all of the application-level information being received via CIFS requests; in some instances, the front-end computing devices may simply forward such information to each other. However, for some data access scenarios (e.g., multiple clients accessing a shared file via different gateways), the storage management systems in each gateway may need to track and actively manage file operations to ensure that data consistency is maintained for the underlying data. Note also that receiving filtering CIFS requests at the front-end computing devices can reduce the amount of protocol chatter that travels over wide-area network links. For instance, a storage management system in a local front-end may be able to resolve some subset of CIFS requests, thereby eliminating the need to forward associated request information to the other components of the distributed storage system and reducing request latency.

In some embodiments, an additional network storage system may be used to provide another level of redundancy (and ensure high availability). For instance, in FIG. 5, either the storage management systems in front-end computing devices 500-502 and/or network storage system 504 may be configured to mirror (e.g., "snapshot") updates to a mirror storage system 506 which is primarily used in failure situations. For instance, if network storage system 504 were to crash or become unavailable due to a network partition, front-end computing devices 500-502 could be configured to temporarily use mirror storage system 506 as their backing store. As an emergency backup, mirror storage system 506 may include fewer resources (e.g., a smaller network link and/or less storage capacity) than network storage system 504, but still ensure that availability and performance guarantees can be met.

In summary, embodiments of the present invention combine NAS capabilities and cloud-based storage to provide a high-capacity, high-reliability storage system that can be accessed from multiple front-ends via an application-layer network protocol. An existing implementation of a request server and a customized filesystem device driver are used to forward request information to a storage management system. This storage management system then determines how to distribute and/or duplicate file information associated with requests between local storage and a cloud storage system. Hence, the disclosed embodiments present an abstraction of one global, extensible filesystem while preserving the abstraction of high-speed local data access.

Computing Environment

Figure 6:
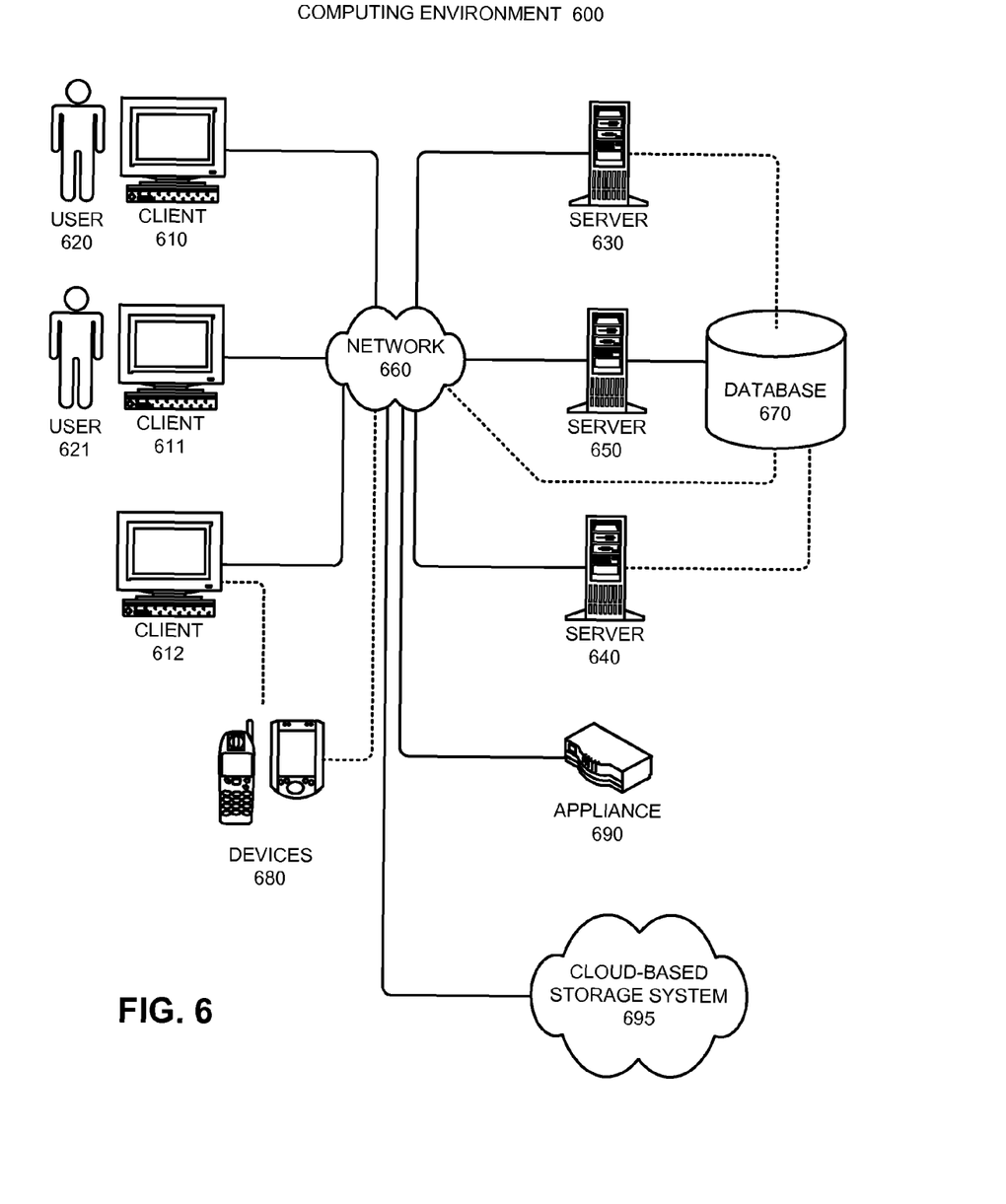
FIG. 6 illustrates a computing environment in accordance with an embodiment.

In some embodiments of the present invention, techniques for forwarding filesystem-level information to a storage management system can be incorporated into a wide range of computing devices in a computing environment. For example, FIG. 6 illustrates a computing environment 600 in accordance with an embodiment of the present invention. Computing environment 600 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 6, computing environment 600 includes clients 610-612, users 620 and 621, servers 630-650, network 660, database 670, devices 680, appliance 690, and cloud-based storage system 695.

Clients 610-612 can include any node on a network that includes computational capability and includes a mechanism for communicating across the network. Additionally, clients 610-612 may comprise a tier in an n-tier application architecture, wherein clients 610-612 perform as servers (servicing requests from lower tiers or users), and wherein clients 610-612 perform as clients (forwarding the requests to a higher tier).

Similarly, servers 630-650 can generally include any node on a network including a mechanism for servicing requests from a client for computational and/or data storage resources. Servers 630-650 can participate in an advanced computing cluster, or can act as stand-alone servers. For instance, computing environment 600 can include a large number of compute nodes that are organized into a computing cluster and/or server farm. In one embodiment of the present invention, server 640 is an online "hot spare" of server 650.

Users 620 and 621 can include: an individual; a group of individuals; an organization; a group of organizations; a computing system; a group of computing systems; or any other entity that can interact with computing environment 600.

Network 660 can include any type of wired or wireless communication channel capable of coupling together computing nodes. This includes, but is not limited to, a local area network, a wide area network, or a combination of networks. In one embodiment of the present invention, network 660 includes the Internet. In some embodiments of the present invention, network 660 includes phone and cellular phone networks.

Database 670 can include any type of system for storing data in non-volatile storage. This includes, but is not limited to, systems based upon magnetic, optical, or magneto-optical storage devices, as well as storage devices based on flash memory and/or battery-backed up memory. Note that database 670 can be coupled: to a server (such as server 650), to a client, or directly to a network. In some embodiments of the present invention, database 670 is used to store information that may later be stored in unused bits of a memory pointer.

Alternatively, other entities in computing environment 600 (e.g., servers 630-650) may also store such data.

Devices 680 can include any type of electronic device that can be coupled to a client, such as client 612. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 680 can be coupled directly to network 660 and can function in the same manner as clients 610-612.

Appliance 690 can include any type of appliance that can be coupled to network 660. This includes, but is not limited to, routers, switches, load balancers, network accelerators, and specialty processors. Appliance 690 may act as a gateway, a proxy, or a translator between server 640 and network 660.

Cloud-based storage system 695 can include any type of networked storage devices (e.g., a federation of homogeneous or heterogeneous storage devices) that together provide data storage capabilities to one or more clients.

Note that different embodiments of the present invention may use different system configurations, and are not limited to the system configuration illustrated in computing environment 600. In general, any device that includes storage and I/O pathways may incorporate elements of the present invention.

Figure 7:
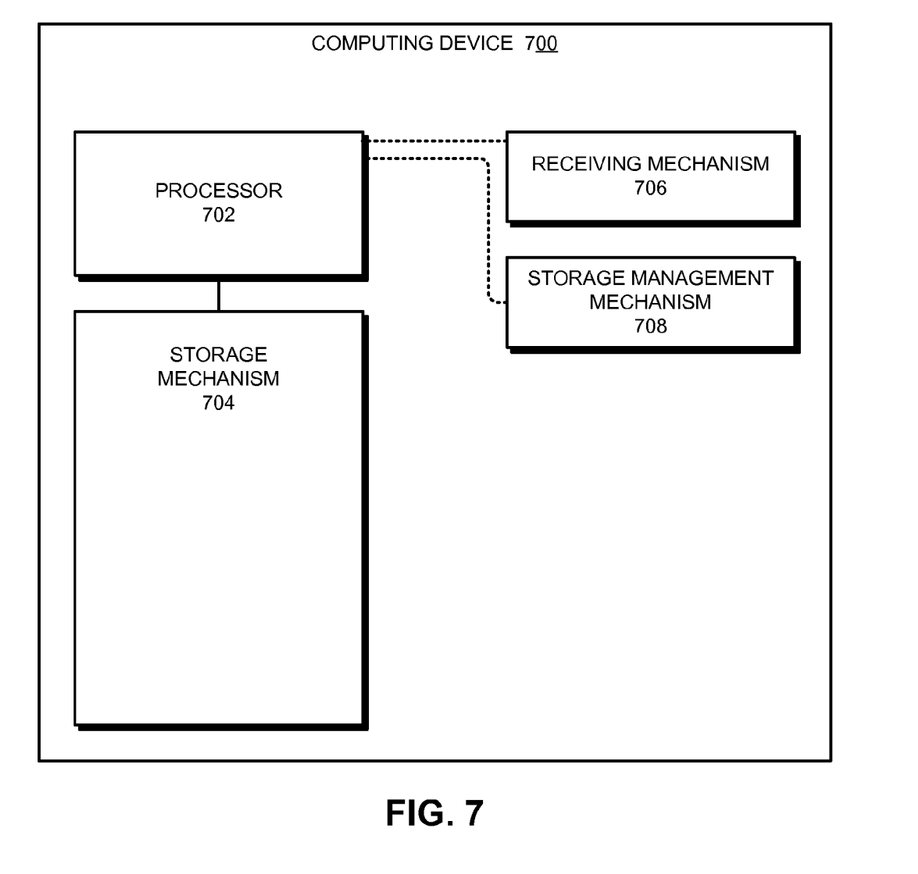
FIG. 7 illustrates a computing device in accordance with an embodiment.

FIG. 7 illustrates a computing device 700 that includes a processor 702 and a storage mechanism 704. Computing device 700 also includes a receiving mechanism 706 and a storage management mechanism 708. Computing device 700 uses receiving mechanism 706 and a file system device driver (not shown) to forward filesystem-level information to storage management mechanism 708.

During operation, computing device 700 uses receiving mechanism 706 to receive a request to perform a file operation from a client computing device. Receiving mechanism 706 issues one or more filesystem operations in response to this request. A filesystem device driver executing on processor 702 extracts filesystem-level information from these filesystem operations, and then forwards the extracted filesystem-level information to storage management mechanism 708. Storage management mechanism 708 uses the forwarded information to store (and manage) data associated with the request in storage mechanism 704 and a remote network storage system (not shown).

In some embodiments of the present invention, some or all aspects of receiving mechanism 706, storage management mechanism 708, and/or a filesystem device driver can be implemented as dedicated hardware modules in computing device 700. These hardware modules can include, but are not limited to, processor chips, application-specific integrated circuit (ASIC) chips, field-programmable gate arrays (FPGAs), memory chips, and other programmable-logic devices now known or later developed.

Processor 702 can include one or more specialized circuits for performing the operations of the mechanisms. Alternatively, some or all of the operations of receiving mechanism 706, storage management mechanism 708, and/or a filesystem device driver may be performed using general-purpose circuits in processor 702 that are configured using processor instructions. Thus, while FIG. 7 illustrates receiving mechanism 706 and/or storage management mechanism 708 as being external to processor 702, in alternative embodiments some or all of these mechanisms can be internal to processor 702.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for forwarding filesystem-level information to a storage management system in a computing device, wherein the storage management systems of multiple computing devices manage front-end caches for data stored in a network storage system, the method comprising:
    receiving a request to perform a file operation from a client computing device via a network;
    issuing one or more filesystem operations associated with the request;
    using a filesystem device driver to extract filesystem-level information from the one or more filesystem operations;
    forwarding the filesystem-level information to the storage management system, wherein the storage management system communicates with a second storage management system of a second computing device to ensure data consistency for the data stored by the network storage system; and
    wherein using the filesystem device driver to extract filesystem-level information facilitates maintaining data consistency for the network storage system while providing multiple client computing devices transparent, shared access to the network storage system.

2. The computer-implemented method of claim 1,
    wherein the storage management system is associated with a network-attached storage device;
    wherein the network-attached storage device caches data stored in the network storage system; and
    wherein the storage management system uses the forwarded filesystem-level information to manage file data associated with the request in the network-attached storage device and the network storage system.

3. The computer-implemented method of claim 2,
    wherein extracting and forwarding the filesystem-level information decouples the request from any specific block-level storage device;
    wherein the method further comprises dynamically adjusting the amount of data storage space available in the network storage system; and
    wherein caching data from the network storage system in the network-attached storage device facilitates transparently providing extensible data storage capabilities to the client computing device in response to the dynamic adjustment in the network storage system.

4. The computer-implemented method of claim 3, wherein the request is a Common Internet File System request.

5. The computer-implemented method of claim 4,
    wherein two or more client computing devices access a shared data set using Common Internet File System requests;
    wherein each of the two or more client computing devices sends Common Internet File System requests to a different request server; and
    wherein the two or more storage management systems facilitate simultaneously allowing the two or more client computing devices to access the shared data set.

6. The computer-implemented method of claim 5, wherein managing file data further involves one or more of the following:
    determining whether to store the file in the network storage system; and
    determining whether to cache the file on the network-attached storage device.

7. The computer-implemented method of claim 6, wherein the filesystem device driver forwards the full set of semantic file information available on the client computing device to the storage management system.

8. The computer-implemented method of claim 7, wherein the forwarded filesystem-level information comprises:
    a file name;
    a file type;
    a requested file operation;
    a set of application information associated with the file;
    one or more users accessing the file; and
    security information for the file.

9. A non-transitory computer-readable storage medium storing instructions that when executed by a computer cause the computer to perform a method for forwarding filesystem-level information to a storage management system in a computing device, wherein the storage management systems of multiple computing devices manage front-end caches for data stored in a network storage system, the method comprising:
    receiving a request to perform a file operation from a client computing device via a network;
    issuing one or more filesystem operations associated with the request;
    using a filesystem device driver to extract filesystem-level information from the one or more filesystem operations;
    forwarding the filesystem-level information to the storage management system, wherein the storage management system communicates with a second storage management system of a second computing device to ensure data consistency for the data stored by the network storage system; and
    wherein using the filesystem device driver to extract filesystem-level information facilitates maintaining data consistency for the network storage system while providing multiple client computing devices transparent, shared access to the network storage system.

10. The non-transitory computer-readable storage medium of claim 9,
    wherein the storage management system is associated with a network-attached storage device;
    wherein the network-attached storage device caches data stored in the network storage system; and
    wherein the storage management system uses the forwarded filesystem-level information to manage file data associated with the request in the network-attached storage device and the network storage system.

11. The non-transitory computer-readable storage medium of claim 10,
- wherein extracting and forwarding the filesystem-level information decouples the request from any specific block-level storage device;
- wherein the method further comprises dynamically adjusting the amount of data storage space available in the network storage system; and
- wherein caching data from the network storage system in the network-attached storage device facilitates transparently providing extensible data storage capabilities to the client computing device in response to the dynamic adjustment in the network storage system.

12. The non-transitory computer-readable storage medium of claim 11, wherein the request is a Common Internet File System request.

13. The non-transitory computer-readable storage medium of claim 12,
- wherein two or more client computing devices access a shared data set using Common Internet File System requests;
- wherein each of the two or more client computing devices sends Common Internet File System requests to a different request server; and
- wherein the two or more storage management systems facilitate simultaneously allowing the two or more client computing devices to access the shared data set.

14. The non-transitory computer-readable storage medium of claim 13, wherein managing file data further involves one or more of the following:
- determining whether to store the file in the network storage system; and
- determining whether to cache the file on the network-attached storage device.

15. The non-transitory computer-readable storage medium of claim 14, wherein the filesystem device driver forwards the full set of semantic file information available on the client computing device to the storage management system.

16. The non-transitory computer-readable storage medium of claim 15, wherein the forwarded filesystem-level information comprises:
- a file name;
- a file type;
- a requested file operation;
- a set of application information associated with the file;
- one or more users accessing the file; and
- security information for the file.

17. A computing device that facilitates forwarding filesystem-level information to a storage management system, comprising:
- a processor;
- a receiving mechanism configured to receive a request to perform a file operation from a client computing device; and
- a storage management mechanism configured to manage file data associated with the request in the computing device and a network storage system, wherein the storage management systems of multiple computing devices manage front-end caches for data stored in the network storage system;
- wherein the receiving mechanism is further configured to issue one or more filesystem operations in response to the request;
- wherein a filesystem device driver executing on the processor extracts filesystem-level information from the one or more filesystem operations; and
- wherein the filesystem device driver is configured to forward the filesystem-level information to the storage management mechanism, wherein the storage management system communicates with a second storage management system of a second device to ensure data consistency for the data stored by the network storage system; and
- wherein using the filesystem device driver to extract filesystem-level information facilitates maintaining data consistency for the network storage system while providing multiple client computing devices transparent, shared access to the network storage system.

18. A computer-implemented method for using a guest operating system to forward filesystem-level information to a storage management system in a computing device, the method comprising:
- executing a guest operating system on a virtual machine that operates within a host operating system on the computing device, wherein the computing device serves as a front-end cache for a network storage system, wherein the network storage system stores data that is being simultaneously accessed by the computing device and a second computing device, wherein the two computing devices cache data stored in the network storage system, wherein the guest operating system includes a CIFS server implementation, wherein the storage management system of the computing device communicates with a second storage management system executing on the second computing device to ensure data consistency for the data stored by the network storage system;
- receiving in the guest operating system a request to perform a CIFS file operation from a client computing device;
- using a filesystem device driver for the guest operating system to forward filesystem-level information associated with the request to the host operating system; and
- using the forwarded information in the storage management system to manage file data associated with the request in the computing device, the second computing device, and the network storage system;
- wherein managing file data associated with the request in the storage management system facilitates simultaneously accessing the same data set via multiple CIFS requests that are routed to different computing devices.

* * * * *